United States Patent
Bush et al.

(10) Patent No.: US 9,728,073 B2
(45) Date of Patent: Aug. 8, 2017

(54) PLUMBING CONTROL SYSTEM WITH DISTRESS SIGNAL

(71) Applicant: SDB IP Holdings, LLC, Oviedo, FL (US)

(72) Inventors: Shawn D. Bush, Orlando, FL (US); Donald Ray Elliott, Orlando, FL (US)

(73) Assignee: SDB IP Holdings, LLC, Oviedo, FL (US)

( * ) Notice: Subject to any disclaimer, the term of this patent is extended or adjusted under 35 U.S.C. 154(b) by 20 days.

(21) Appl. No.: 14/573,608

(22) Filed: Dec. 17, 2014

(65) Prior Publication Data
US 2015/0206417 A1   Jul. 23, 2015

Related U.S. Application Data

(60) Provisional application No. 61/917,550, filed on Dec. 18, 2013.

(51) Int. Cl.
| | |
|---|---|
| *G08B 25/01* | (2006.01) |
| *G08B 25/10* | (2006.01) |
| *G08B 21/02* | (2006.01) |
| *G08B 23/00* | (2006.01) |
| *G08B 21/18* | (2006.01) |
| *G08B 5/00* | (2006.01) |
| *E03F 7/02* | (2006.01) |
| *G01L 19/12* | (2006.01) |
| *G08B 5/36* | (2006.01) |

(52) U.S. Cl.
CPC .............. *G08B 25/016* (2013.01); *E03F 7/02* (2013.01); *G01L 19/12* (2013.01); *G08B 5/002* (2013.01); *G08B 5/36* (2013.01); *G08B 21/02* (2013.01); *G08B 21/18* (2013.01); *G08B 23/00* (2013.01); *G08B 25/10* (2013.01)

(58) Field of Classification Search
CPC ........ G08B 25/016; G08B 25/10; G08B 5/36; G08B 21/20; G08B 23/00; G08B 21/187; E03F 2201/40; E03F 5/042; E03F 7/00; E03F 7/02; Y04S 20/242; Y04S 20/10; Y02B 30/765; G05B 19/43; F25D 29/006; F25D 29/008; F25D 2600/2521; A61G 12/00; A61G 2203/70; Y10S 4/03
See application file for complete search history.

(56) References Cited

U.S. PATENT DOCUMENTS

| | | | |
|---|---|---|---|
| 3,803,579 A * | 4/1974 | Compton | A61G 12/00 340/309.7 |
| 5,307,524 A * | 5/1994 | Veal | E03D 5/10 4/246.1 |
| 6,336,233 B1 | 1/2002 | Shaw et al. | |

(Continued)

FOREIGN PATENT DOCUMENTS

WO       2011133665 A1     10/2011

*Primary Examiner* — Dionne H Pendleton
(74) *Attorney, Agent, or Firm* — The Webb Law Firm

(57) ABSTRACT

A system, device, and method for communicating distress signals through a plumbing control system is provided. The system includes a plumbing controller configured to operate at least one plumbing appliance, at least one distress indicator in communication with the plumbing controller, and at least one distress sensor in communication with the plumbing controller. Activation of the at least one distress sensor causes activation of the at least one distress indicator.

19 Claims, 3 Drawing Sheets

(56) References Cited

U.S. PATENT DOCUMENTS

| | | | |
|---|---|---|---|
| 7,650,652 B2 * | 1/2010 | Schuster | E03D 1/32 4/302 |
| 9,371,639 B1 * | 6/2016 | Schuster | E03D 5/094 |
| 2002/0000092 A1 * | 1/2002 | Sharood | F25D 29/00 62/127 |
| 2003/0201018 A1 | 10/2003 | Bush | |
| 2006/0168716 A1 * | 8/2006 | Schuster | E03D 1/32 4/415 |
| 2007/0030145 A1 | 2/2007 | Marcichow | |
| 2011/0210858 A1 | 9/2011 | White et al. | |
| 2011/0253220 A1 | 10/2011 | Sawaski et al. | |
| 2012/0212344 A1 * | 8/2012 | Forsberg | G08B 3/10 340/573.1 |
| 2015/0137982 A1 * | 5/2015 | Dunn | E03F 7/00 340/606 |

* cited by examiner

PLUMBING CONTROL SYSTEM WITH DISTRESS SIGNAL

This application claims priority to United States Provisional Patent Application No. 61/917,550, filed Dec. 18, 2013, the entire content of which is incorporated herein by reference.

BACKGROUND OF THE INVENTION

Field of the Invention

The present invention relates generally to plumbing control systems and, in particular, a system and method for incorporating a distress signal in a plumbing control system.

Description of Related Art

Federal, state, and/or local regulations may require correctional facilities to incorporate an inmate duress system to alert correctional staff to a situation. For example, regulations may require a duress push button to be located in a prison cell and be in electrical communication with a light-emitting diode (LED) located in an area visible to staff. Therefore, when actuated, the push button will activate the LED and signal that an inmate is under duress. A reset station is used to de-activate the LED after the duress situation is acknowledged and addressed by correctional staff.

To implement such systems, institutions will have to rewire the facilities to provide such functionality. Retrofitting existing buildings and facilities can be costly, time-consuming, and difficult. For example, installing duress push buttons and associated LEDs may require additional equipment to be installed. As regulations change over time, duress systems may have to be modified or expanded to include additional functionality.

Further, implementing a duress system could present issues relating to inmate safety. For example, the visibility of an inmate signaling for duress may cause the inmate to be targeted by others. This safety concern may discourage prisoners that are in duress from calling for help. Accordingly, there is a need for improved duress systems that can be effectively and safely implemented.

SUMMARY OF THE INVENTION

Generally, it is an object of the present invention to provide a distress signaling system and method that overcomes some or all of the above-described deficiencies of the prior art.

According to one preferred and non-limiting embodiment, provided is a distress signaling system for communicating distress signals through an electronic plumbing control system, comprising: a plumbing controller configured to operate at least one plumbing appliance; at least one distress indicator in communication with the plumbing controller; and at least one distress signaling device in communication with the plumbing controller, wherein activation of the at least one distress signaling device causes activation of the at least one distress indicator.

In non-limiting embodiments, the distress signaling system may further comprise a reset device in communication with the plumbing controller, wherein the reset device configured to deactivate the at least one distress indicator. The reset device may be configured to deactivate the at least one distress indicator in response to a physical key being inserted into the reset device and turned.

In non-limiting embodiments, the distress signaling system may further comprise at least one management computer configured to display at least one graphical user interface, wherein the at least one distress indicator comprises an alert displayed on the at least one graphical user interface. The at least one management computer may be further configured to deactivate the at least one distress indicator. The at least one management computer may be further configured to deactivate the at least one distress indicator only during a predetermined time period.

In non-limiting embodiments, the at least one distress indicator comprises at least one light-emitting device. Further, in non-limiting embodiments, the at least one distress signaling device comprises at least one trigger device for the at least one plumbing appliance, and the at least one trigger device may be configured to activate the at least one plumbing appliance based on a first input, and to activate the at least one distress indicator based on a second input. In non-limiting embodiments, the second input may comprise at least one of the following: repeated actuation of the at least one trigger device, actuation of the at least one trigger device for a predetermined time period, a predetermined number of inputs during a specified time, or any combination thereof.

According to another preferred and non-limiting embodiment, provided is a distress signaling system for communicating distress signals through a plumbing control system of an institution, comprising: at least one distress signaling device; and a plumbing control system comprising at least one electronic plumbing controller configured to: control at least one plumbing appliance; receive input from the at least one distress signaling device; and activate at least one distress indicator based on the input.

In non-limiting embodiments, the distress signaling system may further comprise the at least one distress indicator, and the at least one distress indicator may comprise at least one of a light-emitting device and a portion of a graphical user interface.

In non-limiting embodiments, the distress signaling system may further comprise at least one reset device configured to communicate with the at least one electronic plumbing controller, wherein the at least one electronic plumbing controller is further configured to deactivate the at least one distress indicator based on input from the at least one reset device.

In non-limiting embodiments, the distress signaling system may further comprise at least one computer-readable medium comprising program instructions that, when executed by at least one processor of at least one computer, causes the at least one computer to: receive, from the at least one plumbing controller, at least one signal based on the input; and display, on at least one graphical user interface, the at least one distress indicator, wherein the at least one distress indicator comprises a visual alert on the at least one graphical user interface.

In non-limiting embodiments, the at least one distress signaling device may comprise at least one trigger device for the at least one plumbing appliance, and the at least one trigger device may be configured to activate the at least one plumbing appliance based on a first input, and to activate the at least one distress indicator based on a second input. In non-limiting embodiments, the second input comprises at least one of the following: repeated actuation of the at least one trigger device, actuation of the at least one trigger device for a predetermined time period, a predetermined number of inputs during a specified time, or any combination thereof.

In non-limiting embodiments, the at least one plumbing appliance and the at least one distress signaling device are arranged in at least one unit of a correctional institution.

In non-limiting embodiments, the at least one electronic plumbing controller may activate the at least one distress indicator by communicating a signal wirelessly to the at least one distress indicator.

In non-limiting embodiments, the distress signaling system may include a management computer including at least one processor, wherein the management computer configured to display at least one graphical user interface configured to control a plurality of electronic plumbing controllers including the at least one electronic plumbing controller. In non-limiting embodiments, the distress signaling system may include a local management computer including at least one processor, wherein the local management computer configured to display at least one second graphical user interface configured to control a subset of electronic controllers of the plurality of electronic plumbing controllers.

According to a further preferred and non-limiting embodiment, provided is a method for signaling distress with a plumbing controller in an institution, comprising: providing, in the institution, a plumbing control system configured to operate at least one fixture; receiving, by the plumbing control system, input from at least one distress signaling device in at least one unit of the correctional institution; and activating, with the plumbing control system, at least one distress indicator in response to the input.

In non-limiting embodiments, the method for signaling distress with a plumbing controller in an institution may further comprise: receiving, by the plumbing control system, input from at least one reset device; and deactivating the at least one distress indicator in response to the input from the at least one reset device.

In non-limiting embodiments, the at least one distress signaling device may comprise at least one trigger device configured to operate the at least one fixture, and the method may further comprise determining, with at least one processor based at least partially on the input, whether to operate the at least one fixture or activate the at least one distress indicator.

In non-limiting embodiments, the at least one fixture may be operated if the at least one distress indicator is actuated once, and wherein the at least one distress indicator is activated in response to the input if the at least one distress indicator is actuated in at least one of the following ways: actuated repeatedly, actuated for a predetermined time period, actuated a predetermined number of instances during a specified time period, or any combination thereof.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
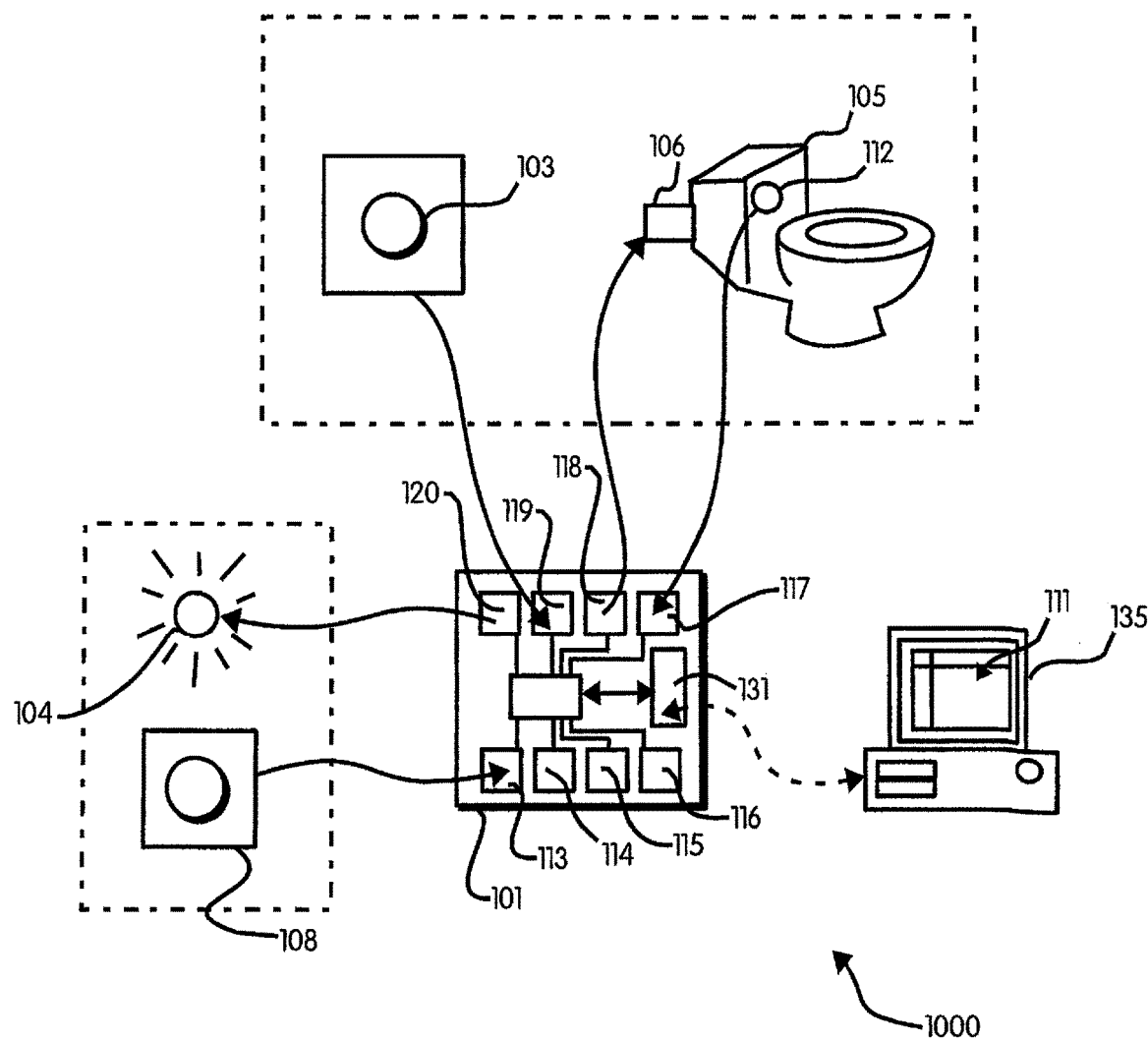
FIG. 1 illustrates a schematic diagram of one embodiment of a plumbing control system for signaling distress according to the principles of the present invention.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. It will be appreciated that numerous other arrangements are possible.

Referring to FIG. 1, a distress signaling system 1000 is shown according to a preferred and non-limiting embodiment of the present invention. The distress signaling system 1000 is configured for communicating distress signals through an electronic plumbing control system. The system 1000 includes an electronic plumbing controller 101, a distress signaling device 103, and a distress indicator 111. The electronic plumbing controller 101 may include one or more circuits and/or computing devices, including but not limited to one or more microprocessors 109 and input/output ports 113-120. It will be appreciated that the electronic plumbing controller 101 may also include any number of controllers, processors, computers, and/or the like, and that input to and output from the plumbing controller 101 may occur in any number of ways. For example, a port may allow input and output, just input, or just output. Moreover, input/output ports may also include one or more wired or wireless interfaces that allow for data to be inputted to and outputted by the controller 101. Other arrangements are possible.

The electronic plumbing controller 101 may be used to operate and control one or more plumbing fixtures 106, such as an electronic plumbing fixture 106 associated with a plumbing appliance 105. A plumbing appliance 105 may include, for example, a toilet, shower, faucet, and/or the like, and a plumbing fixture 106 may include an electronic valve, regulator, and/or the like. It will be appreciated that any number of plumbing appliances 105 and fixtures 106 may be used with the system 1000. As an example, the electronic plumbing controller 101 may cause a toilet to be flushed, cause a shower or faucet to turn on, regulate the use of an appliance, restrict the use of an appliance to certain time periods or frequencies, and/or the like. As a further example, in non-limiting embodiments the electronic plumbing controller 101 may flush a toilet in response to a signal from a trigger device on the toilet, or in response to a signal from a remote computer or controller. It will be appreciated by those skilled in the art that the electronic plumbing controller 101 may control various plumbing fixtures in various ways.

With continued reference to FIG. 1, a fixture 106 may include, for example, a solenoid-driven flush valve for flushing a toilet or a regulator valve for a shower or faucet. A fixture may also include any other device or system that regulates, controls, operates, and/or provides fluids to or from a plumbing appliance. A trigger device 112 is in communication with the plumbing controller 101 and is programmed, configured, and/or adapted to operate the plumbing fixture 106 (e.g., cause the fixture to flush, start, stop, and/or the like). In some non-limiting embodiments, multiple trigger devices 112 may provide various functions for plumbing fixtures 106. A trigger device may include, for example, a button, switch, lever, sensor, and/or the like, that can be activated based on physical actuation, touch, motion, proximity, and/or the like.

A distress indicator 104 may include, but is not limited to, one or more light-emitting diodes (LED), light bulbs, audible alarms, alerts on a graphical user interface, and/or the like. Further, in non-limiting embodiments, the LEDs or bulbs may be any number of colors, and may be configured to flash when activated. In some examples, lights of different colors may be provided for different indications. The distress indicator 104 may also be a combination of visual and audible alarms. In some non-limiting embodiments, the distress indicator 104 may be in multiple forms. For example, the distress indicator 104 may be an LED mounted on a wall or control panel, and may also be a visual or audible alert displayed or emitted from a management computer. It will be appreciated that various other arrangements are possible.

Still referring to FIG. 1, the I/O ports 113-120 on the plumbing controller 101 may be in electrical communication with a microprocessor 109 or other like control device. The plumbing controller 101 may also include a communication device for interfacing the I/O ports 113-120 with the trigger device 112, distress signaling device 103, distress indicator 104, fixture 106, appliance 105, and/or other systems and devices. In non-limiting embodiments, separate electronic plumbing controllers 101, in communication with a common plumbing network, may be used to respectively operate the fixture 106 and the distress indicator 104. In other non-limiting embodiments, a single electronic plumbing controller 101 may be used to operate the fixture 106 and the distress indicator 104. It will be appreciated that various other arrangements are possible.

In a preferred and non-limiting embodiment, and with reference to FIG. 1, the distress signaling device 103 and/or trigger device 112 may include a button or other like switching or sensing arrangement that activates or produces a signal based on actuation, touch, proximity, and/or the like. It will be appreciated that the distress signaling device 103 and/or trigger device 112 may be any type of input device or sensor such as, but not limited to, one or more accelerometers, capacitive touch sensors, pressure transducers, switches, buttons, infrared sensors, proximity sensors, and/or the like. The distress signaling device 103 may be located on a wall of a cell or unit, for example, or may be affixed to a floor, a piece of furniture, an appliance 105, a cell door, or the like. The trigger device 112 may be located adjacent to or on an associated appliance 105 or fixture 106, or may alternatively be located anywhere else that is accessible by a user of the appliance 105.

Still referring to FIG. 1, in a preferred and non-limiting embodiment, a reset device 108 may be in communication with the electronic plumbing controller 101. The reset device 108 may be located adjacent the distress indicator 104, in a central control room, in a hallway, in a chase area, and/or the like. The reset device 108 is programmed and/or configured to, upon activation, cause the distress indicator 104 to turn off or deactivate once it has already been activated and is in an activated state. In a preferred and non-limiting embodiment, the reset device 108 may be a two-position key switch that requires a key to activate. Using a two-position key switch, a momentary position (e.g., turned to the right or left) may deactivate the distress indicator 104. Although the key switch may accept a physical key, it will be appreciated that the reset device 108 may be configured to allow verification and/or authentication to be provided with keypads, wireless signals (e.g., radio frequencies), biometrics, and/or the like. Further, the reset device 108 may include any type of input device or sensor such as, but not limited to, switches, buttons, accelerometers, capacitive touch sensors, pressure transducers, and/or the like. In non-limiting embodiments, the reset device 108 may be a computer, such as a workstation or mobile device, and a graphical user interface may present options that allow an operator to deactivate the distress indicator 104.

With continued reference to FIG. 1, the electronic plumbing controller 101 includes a communications port 131 that is configured to communicate with a management computer 135. The communications port 131 may communicate with the management computer 135 over a wired connection, local area network, wide area network, and/or other like communications network. In non-limiting embodiments, a server may facilitate communication between the communications port 131 and the management computer 135, and in non-limiting embodiments the communication may occur directly without the use of a server. The management computer 135 may be any computing device such as, for example, a desktop or laptop computer, a mobile device, and/or the like. In non-limiting embodiments, the management computer 135 includes software that is programmed and/or configured to communicate with the electronic plumbing controller 101. In non-limiting embodiments, the software may be specially purposed for communication with the electronic plumbing controller 101, or a web browser that communicates with the electronic plumbing controller 101 through a web server. Various other implementations are possible.

Still referring to FIG. 1, the management computer 135 may include a processor and a display device and be programmed, configured, and/or adapted to generate one or more graphical user interfaces 111 that display menu screens, facility or building maps, and various selectable options on the display device. For example, the graphical user interface 111 may display a view of rooms and/or units in a building or facility, indicating the locations of distress signaling devices 103, appliances 105, and/or fixtures 106. The selectable options may allow users of the management computer 135 to operate and monitor the fixtures 106 associated with plumbing appliances 105, and may also allow users to view the rooms and/or units that have activated a distress signaling device 103. Selectable options may also be provided to reset (i.e., deactivate or turn off)

distress indicators 104, set lockout times for the fixtures 106, and manage other aspects of the plumbing and distress systems. The selectable options on the user interface 111 may include, but are not limited to, drop-down boxes, radio buttons, check boxes, buttons, icons, input fields, and/or the like.

In a preferred and non-limiting embodiment, the distress signaling system 1000 is adapted to be installed in an institutional environment, such as a correctional facility. Thus, the system 1000 allows for detainees to signal that they are distressed and in need of help from correctional staff. However, it will be appreciated that the distress signaling system 1000 may be used in any environment or facility in which a distress signal is desired. For example, the system 1000 may be implemented in a medical facility where patients using a restroom may be at risk of slipping or otherwise injuring themselves. Various other arrangements and uses are possible.

Figure 2:
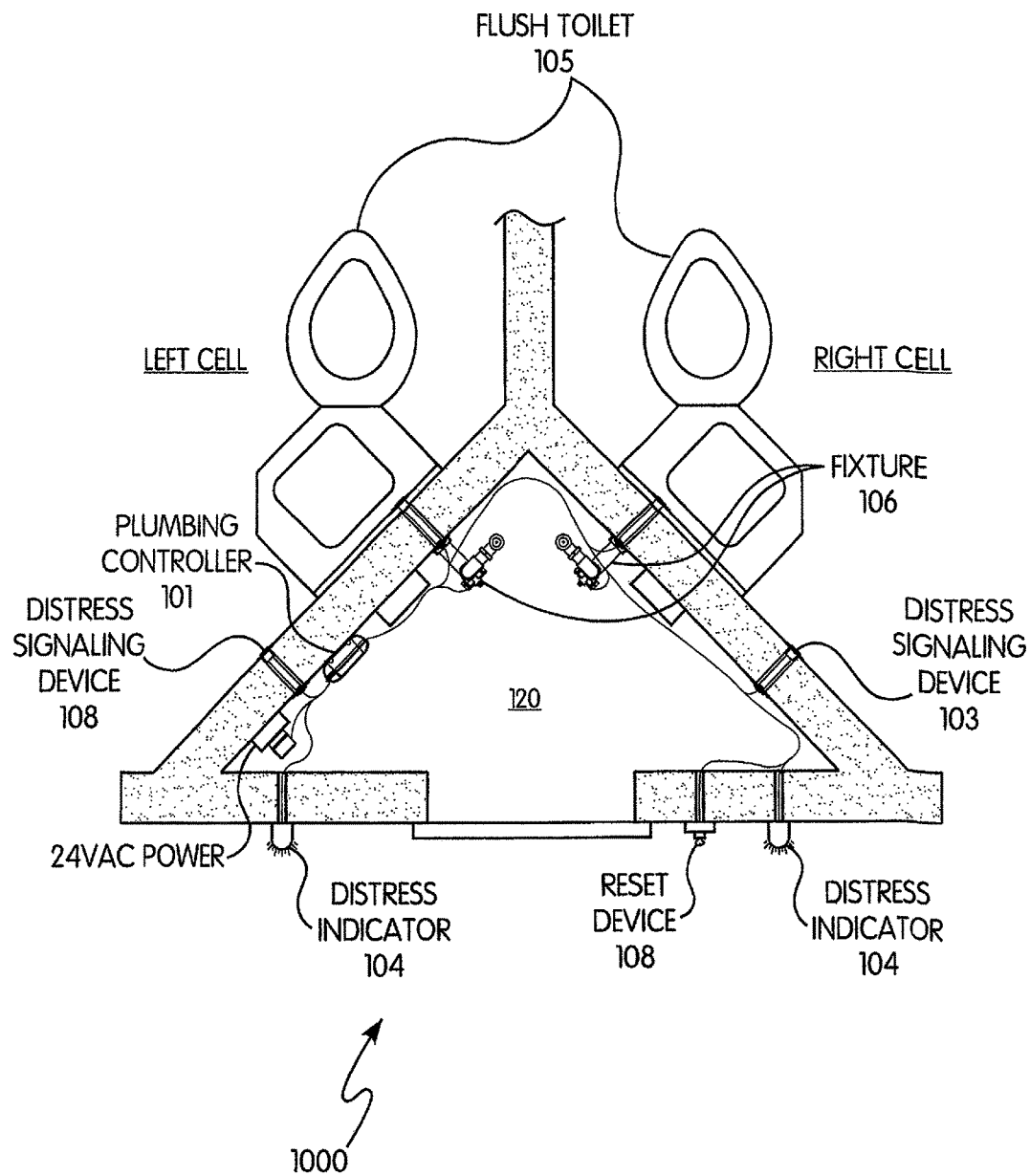
FIG. 2 illustrates a schematic diagram of one embodiment of a plumbing control system for signaling distress installed in a correctional institution according to the principles of the present invention.

Referring to FIG. 2, an installation of the system 1000 is shown in a correctional institution according to a preferred and non-limiting embodiment. The plumbing controller 101 may be located in a chase area 120 outside of a unit or cell and is in communication with the trigger device 112, distress signaling device 103, and plumbing appliance 105 through wires, cables, wireless devices, and/or the like. The trigger device 112, plumbing appliance 105, and distress signaling device 103 may be arranged anywhere in the unit or cell. In the example shown in FIG. 2, two cells share a common chase area 120 and a common controller 101. The distress indicator 104 may be located outside of the chase 120 and the cells, at a distance from or adjacent to each cell. Moreover, distress indicators 104 and a reset device 108 are positioned in an area accessible and visible to correctional staff.

Figure 3:
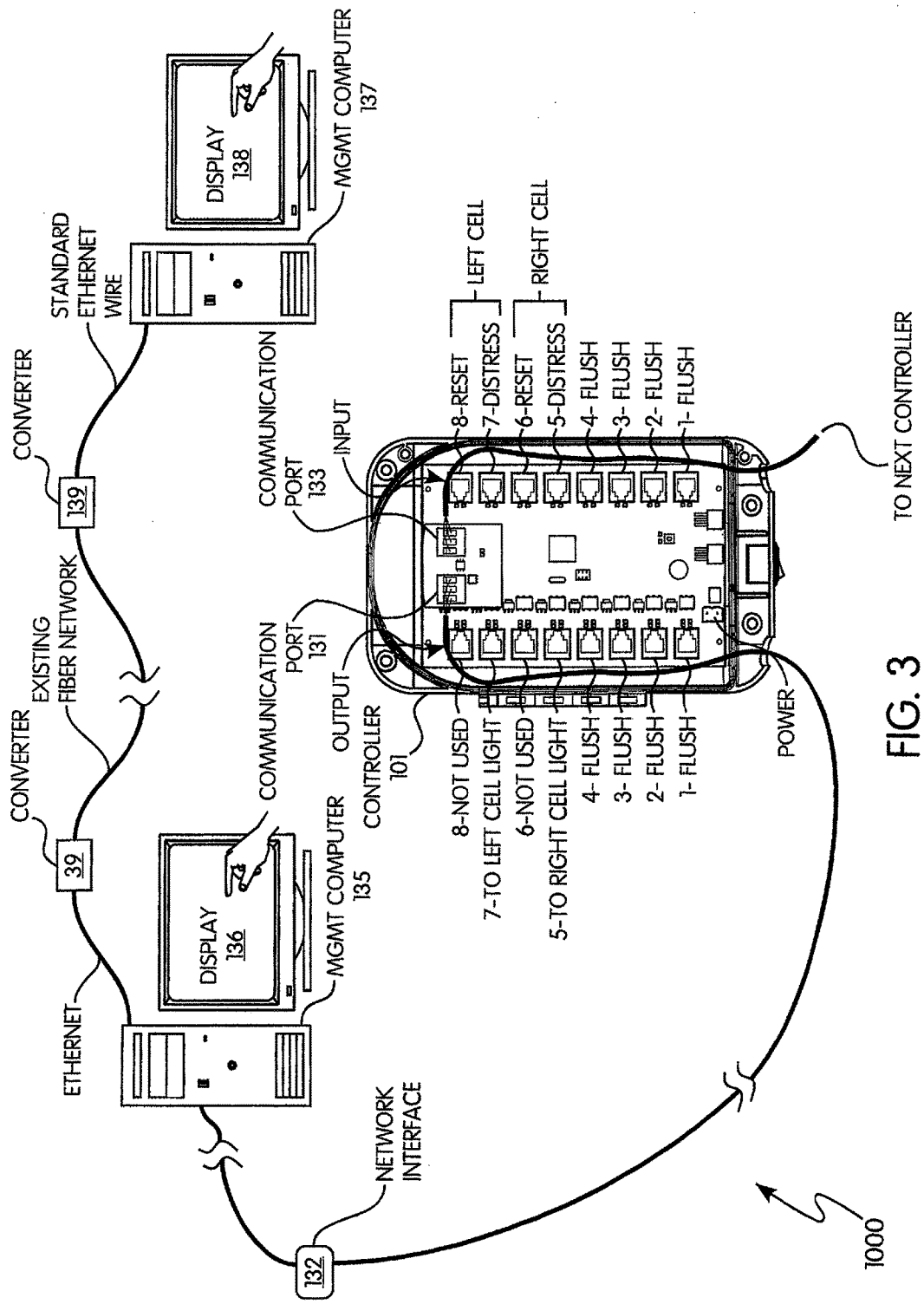
FIG. 3 illustrates a schematic diagram of another embodiment of a plumbing control system for signaling distress according to the principles of the present invention.

Referring now to FIG. 3, a distress signaling system 1000 is shown according to a preferred and non-limiting embodiment. The electronic plumbing controller 101 includes a number of I/O ports that are used to control plumbing appliances (not shown) and distress indicators (not shown). In the example shown, the left-most ports are used for output, and the right-most ports are used for input. For example, one or more distress signaling devices (not shown) and trigger devices (not shown) may interface with the input ports of the controller 101, and one or more distress indicators (not shown) and plumbing fixtures (not shown) may interface with the output ports of the controller 101. The controller 101 depicted in FIG. 3 includes eight (8) input ports and eight (8) output ports, although it will be appreciated that several different types of controllers 101, with various types and numbers of ports, may be used.

Further, with continued reference to FIG. 3, communication ports 131, 133 are used to network multiple plumbing controllers 101 together and to communicate with one or more management computers 135, 137. For example, communications port 131 may interface with a first management computer 135 or a network in communication with the first management computer 135. Another communications port 133 may communicate with other plumbing controllers, allowing multiple controllers to be linked or chained together. In the illustrated example, a USB network interface 132 is used to interface between the communications port 131 of the controller 101 and the first management computer 135. It will be appreciated that various interfacing and communications arrangements may be used to effectuate communication between components of the system 1000.

With continued reference to FIG. 3, the first (e.g., local) management computer 135 may be used to manage a first group of controllers 101 that are situated in a particular region or area of a building. The local management computer 135 may include a display device 136 and an input device, as examples. There may be multiple management computers 135 networked together to manage different regions or areas of the building. Converters 139 (e.g., fiber/Ethernet converters) may be used to allow the management computers 135 to communicate on an existing fiber network, although it will be appreciated that various arrangements for facilitating communication between the management computers 135, 137 and the controller(s) 101 may be employed, including but not limited to wired and wireless local area networks, wide area networks, and/or the like.

Still referring to FIG. 3, the management computers 135, 137 may be any computer, remote or local to the facility or building, programmed, configured, and/or adapted to communicate with the system 1000. For example, a user's computer or device may become a central management computer 137 by logging into a network and receiving data configured to generate a user interface through, for example, a web browser or other software application. In the illustrated example, the central management computer 137 communicates with an existing fiber network via a converter 139. In non-limiting embodiments, various arrangements may be used to communicate between the controller 101 and the management computers 135, 137 including, but not limited to, wireless communication over a network, direct controller-to-computer wireless communication, secure web-based communication, hardwired network connections, and/or the like.

In a preferred and non-limiting embodiment, the central management computer 137 may be programmed and/or configured to communicate with all of the controllers 101 in a building or facility, or multiple facilities. The central management computer 137 may therefore be used to centrally and/or remotely control and manage plumbing fixtures and distress indicators. In some embodiments, the central management computer 137 may have administrative rights over the other management computers 135 for a region or area, and may be configured to override and/or monitor the other management computers 135. The management computers 135, 137 may be configured, programmed, and/or adapted to display one or more graphical user interfaces on the displays 136, 138 that provide visual representations and various selectable options, as already described.

The management computers 135, 137 may include display devices 136, 138 that are touch-sensitive and also serve as an input device. The user of the management computers 135, 137, through the user interfaces, may be able to view any rooms, units, or cells that have activated a distress signaling device. The user interfaces may also be configured to serve as a reset device, providing selectable options to disable or deactivate a distress indicator. The software executed by the management computers 135, 137 translates these commands into signals that are communicated to the electronic plumbing controller 101. Various other selectable options may, for example, enable or disable portions of the distress signaling system, enable or disable distress signaling devices in a particular room, unit, or cell, display statistics regarding the usage of the distress signaling devices and indicators, set lock-out times for all or some of the distress signaling devices, and/or the like.

In a preferred and non-limiting embodiment, the management computer 135 may be limited to only reset or deactivate (e.g., turn off, silence, etc.) the distress indicators or alarm in certain conditions or situations. For example, the management computer 135 may allow a user, through the user interface, to reset or deactivate the distress indicators or alarm only for a predetermined period of time (e.g., 90 seconds) after being activated. After this time, the distress indicator or alarm would have to be reset or deactivated at a physical reset device located near the distress indictor or elsewhere (e.g., in a chase area, hallway, room, etc.). It will be appreciated that various different periods of time may be used. Further, in other non-limiting embodiments, the management computer 135 may be able to always reset or deactivate the distress indicators, regardless of the time that has passed since being activated.

Further, in non-limiting embodiments, the distress signaling device 103 may serve as a trigger device 112 for a fixture 106 associated with an appliance 105. For example, the at least one distress signaling device 103 may be a trigger device 112 for a fixture 106, and may be programmed, configured, and/or adapted to activate the fixture 106 based on a first input, and to activate the distress indicator based on a second input that is different from the first input. For example, a trigger device 112 for a plumbing fixture 106 may activate the fixture 106 if it is actuated once, and may activate the distress indicator 104 if repeatedly actuated, actuated for a predetermined time period, actuated with a predetermined force, and/or actuated a predetermined number of times during a predetermined time period, as examples. It will be appreciated that numerous other arrangements are possible in which a single trigger device 112 serves to operate or activate both a plumbing fixture 106 and a distress indicator 104 in response to different inputs.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A distress signaling system for communicating distress signals through an electronic plumbing control system, comprising:
a plumbing controller configured to operate at least one plumbing appliance;
at least one distress indicator in communication with the plumbing controller; and
at least one distress signaling device in communication with the plumbing controller, wherein activation of the at least one distress signaling device causes activation of the at least one distress indicator,
wherein the at least one distress signaling device comprises at least one trigger device for the at least one plumbing appliance, wherein the at least one trigger device is configured to activate the at least one plumbing appliance based on a first input including a first type of actuation of the at least one trigger device, and to activate the at least one distress indicator based on a second input including a second type of actuation of the at least one trigger device, and wherein the first type of actuation of the at least one trigger device is different than the second type of actuation of the at least one trigger device.

2. The distress signaling system of claim 1, further comprising a reset device in communication with the plumbing controller, the reset device configured to de-activate the at least one distress indicator.

3. The distress signaling system of claim 2, wherein the reset device is configured to deactivate the at least one distress indicator in response to a physical key being inserted into the reset device and turned.

4. The distress signaling system of claim 1, further comprising at least one management computer configured to display at least one graphical user interface, wherein the at least one distress indicator comprises an alert displayed on the at least one graphical user interface.

5. The distress signaling system of claim 4, wherein the at least one management computer is further configured to deactivate the at least one distress indicator.

6. The distress signaling system of claim 5, wherein the at least one management computer is configured to deactivate the at least one distress indicator only during a predetermined time period.

7. The distress signaling system of claim 1, wherein the at least one distress indicator comprises at least one light-emitting device.

8. The distress signaling system of claim 1, wherein the second input comprises at least one of the following: repeated actuation of the at least one trigger device, actuation of the at least one trigger device for a predetermined time period, a predetermined number of inputs during a specified time, or any combination thereof.

9. A distress signaling system for communicating distress signals through a plumbing control system of an institution, comprising:
at least one distress signaling device; and
a plumbing control system comprising at least one electronic plumbing controller configured to:
(i) control at least one plumbing appliance;
(ii) receive input from the at least one distress signaling device; and
(iii) activate at least one distress indicator based on the input,
wherein the at least one distress signaling device comprises at least one trigger device for the at least one plumbing appliance, wherein the at least one trigger device is configured to activate the at least one plumbing appliance based on a first input including a first type of actuation of the at least one trigger device, and to activate the at least one distress indicator based on a second input including a second type of actuation of the at least one trigger device, and wherein the first type of actuation of the at least one trigger device is different than the second type of actuation of the at least one trigger device.

10. The distress signaling system of claim 9, further comprising the at least one distress indicator, the at least one distress indicator comprising at least one of a light-emitting device and a portion of a graphical user interface.

11. The distress signaling system of claim 9, further comprising at least one reset device configured to communicate with the at least one electronic plumbing controller, wherein the at least one electronic plumbing controller is further configured to deactivate the at least one distress indicator based on input from the at least one reset device.

12. The distress signaling system of claim 9, further comprising at least one non-transitory computer-readable medium comprising program instructions that, when executed by at least one processor of at least one computer, causes the at least one computer to:

receive, from the at least one plumbing controller, at least one signal based on the input; and display, on at least one graphical user interface, the at least one distress indicator, wherein the at least one distress indicator comprises a visual alert on the at least one graphical user interface.

13. The distress signaling system of claim 9, wherein the second input comprises at least one of the following: repeated actuation of the at least one trigger device, actuation of the at least one trigger device for a predetermined time period, a predetermined number of inputs during a specified time, or any combination thereof.

14. The distress signaling system of claim 9, wherein the at least one plumbing appliance and the at least one distress signaling device are arranged in at least one unit of a correctional institution.

15. The distress signaling system of claim 9, wherein the at least one electronic plumbing controller activates the at least one distress indicator by communicating a signal wirelessly to the at least one distress indicator.

16. The distress signaling system of claim 9, further comprising a management computer including at least one processor, the management computer configured to display at least one graphical user interface configured to control a plurality of electronic plumbing controllers including the at least one electronic plumbing controller.

17. The distress signaling system of claim 16, further comprising a local management computer including at least one processor, the local management computer configured to display at least one second graphical user interface configured to control a subset of electronic controllers of the plurality of electronic plumbing controllers.

18. A method for signaling distress with a plumbing controller in an institution, comprising:

providing, in the institution, a plumbing control system configured to operate at least one fixture;

receiving, by the plumbing control system, input from at least one distress signaling device in at least one unit of the correctional institution; and activating, with the plumbing control system, at least one distress indicator in response to the input, wherein the at least one distress signaling device comprises at least one trigger device configured to operate the at least one fixture, the method further comprising determining, with at least one processor based at least partially on the input, whether to operate the at least one fixture or activate the at least one distress indicator, and wherein the at least one fixture is operated if the at least one distress signaling device is actuated once, and wherein the at least one distress indicator is activated in response to the input if the at least one distress signaling device is actuated in at least one of the following ways: actuated repeatedly, actuated for a predetermined time period, actuated a predetermined number of instances during a specified time period, or any combination thereof.

19. The method of claim 18, further comprising:

receiving, by the plumbing control system, input from at least one reset device; and deactivating the at least one distress indicator in response to the input from the at least one reset device.

* * * * *